United States Patent [19]
Lee

[11] Patent Number: 5,635,783
[45] Date of Patent: Jun. 3, 1997

[54] BRUSHLESS DIRECT CURRENT MOTOR

[75] Inventor: Hae Seok Lee, Seoul, Rep. of Korea

[73] Assignee: LG Electronics, Inc., Seoul, Rep. of Korea

[21] Appl. No.: 458,744

[22] Filed: Jun. 2, 1995

[30] Foreign Application Priority Data

Jun. 9, 1994 [KR] Rep. of Korea ............... 13385/1994

[51] Int. Cl.$^6$ ............... H02K 7/14; H02K 7/08
[52] U.S. Cl. ............... 310/90; 310/67 R
[58] Field of Search ............... 310/67 R, 90; 360/98.07, 98.04, 98.08

[56] References Cited

U.S. PATENT DOCUMENTS

| 5,128,574 | 7/1992 | Koizumi et al. | 310/90 |
| 5,134,331 | 7/1992 | Miyagi et al. | 310/90 |
| 5,402,023 | 3/1995 | Nakanishi et al. | 310/90 |
| 5,465,020 | 11/1995 | Peterson | 310/194 |
| 5,483,113 | 1/1996 | Sakuragi et al. | 310/67 R |

Primary Examiner—Steven L. Stephan
Assistant Examiner—Michael Wallace, Jr.

[57] ABSTRACT

The present invention relates to a brushless direct current motor which includes a second magnet mounted on an inner part of the motor bush in such a way so as to allow an attractive engaging force between the bearing bush and the second magnet. Also, the BLDC motor further includes a third magnet mounted on a lower surface of a rotor yoke inserted at an upper part of the motor bush, and a fourth magnet mounted on an upper surface of a rotor yoke. This separate second magnet is provided for attractively engaging the main base for preventing any separation of the rotor unit from the main base even when the motor is flipped over or overturned, thus allowing feasible adjustment of the magnet size according to the motor requirement conditions. Additionally, head noise due to the magnetic leakage flux, needed for attractively engaging the magnet to the main base, which influences the head and other circuitry, can be effectively reduced. Also, the flux in the air gap is increased by an amount equal to the decreased amount of the leakage magnetic flux, in order to increase to torque of the motor.

3 Claims, 2 Drawing Sheets

BRUSHLESS DIRECT CURRENT MOTOR

BACKGROUND OF THE INVENTION

1. Field of the Invention

This invention relates to a brushless direct current (BLDC) motor having a plurality of magnets in order to increase a torque of the motor and to reduce a noise of a device driven by such a motor.

2. Description of the Conventional Art

A brushless direct current (BLDC) motor is often used as a driving motor of an optical scanning apparatus or a video tape recorder head scanner.

In the brushless direct current motor as shown in FIG. 1, an oil-less beating 1 is mounted at a predetermined position spaced from an upper surface of a washer 2.

The washer 2 is integrally formed with a bearing bush 3 by a caulking process such as a rivetting process. Also, the beating bush 3 is engaged with a main base 4 by a caulking process. A motor bush 5, which is part of the rotor, is inserted into a motor shaft 6 and is integrally engaged with a rotor yoke 7 by a caulking process.

A first magnet 8 is mounted on an upper surface of the rotor yoke 7. The rotor yoke 7 is made of a magnetic material and is spaced from the main base 4 when the motor shaft 6 is inserted into the oil-less beating 1.

Also, a back yoke 9 is inserted onto the motor bush 5 and is fixed in place by means of the magnetic force of the first magnet 8. A fine pattern coil 10 is engaged and fixed on the main base 4 by screws (not shown) to be disposed between the first magnet 8 and the back yoke 9.

The motor shown in FIG. 1 has an axial air gap between the first magnet 8 and the fine pattern coil 10. The magnetic flux of the driving magnetic poles of the magnet 4 interacts with the fine pattern coil 10. When drive currents are supplied to the fine pattern coil 10, they generate driving magnetic flux which interact with the magnetic flux of the driving magnetic poles to rotate the magnet 4 and hence the rotor yoke 7 and motor bush 5.

When a conventional BLDC motor is driven in such an arrangement, a belt 11 engaged with the motor bush 5 is driven and thus a rotation force of the motor is transferred to a mechanical mechanism (not shown). At this time, the magnet flux created from the first magnet 8 is magnetized along the direction indicated by the arrows as shown in FIG. 1.

The magnetic flux which leaks in a downward direction (direction of the arrows in FIG. 1) from the magnet 8, acts as an attractive engaging force to the main base 4 and prevents any separation of the rotor unit from the oil-less bearings 1 even when the motor is inverted or overturned. There are problems if the attractive engaging force is too weak, hence the rotor unit will come off due to its own weight, and if the attractive engaging force is too strong, in other words, when the leakage magnetic flux is high, then magnetic loss, which is proportional to the squared value of the increased portion of the leakage magnetic flux, will increase.

As explained above, when a conventional BLDC motor is inverted or overturned, possible dislodgement of the motor unit is prevented by the attractive engaging force which pulls together the first magnet 8 and the main base 4, through the use of the magnetic leakage flux. The thickness of the rotor yoke 7 and the size of the magnet 8 are determined according to the degree of attractive engaging force between the first magnet 8 and the main base 4, while power consumption, the relation to magnetic flux and noise reduction in addition to many other restrictive requirements which need to be considered in motor design are all regarded as disadvantages.

SUMMARY OF THE INVENTION

Accordingly, an object of the present invention is to provide a separate magnet for attractively engaging the main base, thus making feasible adjustment of the magnet size according to file motor requirement conditions.

Another object of the present invention is to reduce the head noise due to the magnetic leakage flux, needed for attractively engaging the magnet to the main base, which influences the scanner head and other circuitry. Also, the flux in the air gap is increased by an amount equal to the decreased amount of the leakage magnetic flux, in order to increase the torque of the motor.

For achieving the above object of the present invention, a magnet is fixed to the upper portion of a rotor yoke which is caulked to the motor bush. In a BLDC motor, in which the motor bush and motor shaft are attractively engaged with the main base, a second magnet is fixed at an inner portion of the motor bush and arranged in such a way that an attractive engaging force occurs between the bearing bush and the second magnet.

A third magnet may be placed at a lower portion of the back yoke which is inserted on an upper portion of the motor bush opposing the first magnet.

BRIEF DESCRIPTION OF THE DRAWINGS

Preferred embodiments of the invention will now be described in detail with reference to the accompanying drawings, in which.

DESCRIPTION OF THE PREFERRED EMBODIMENTS

A first embodiment of an electric motor according to the present invention will be described with reference to FIG. 2.

Figure 1:
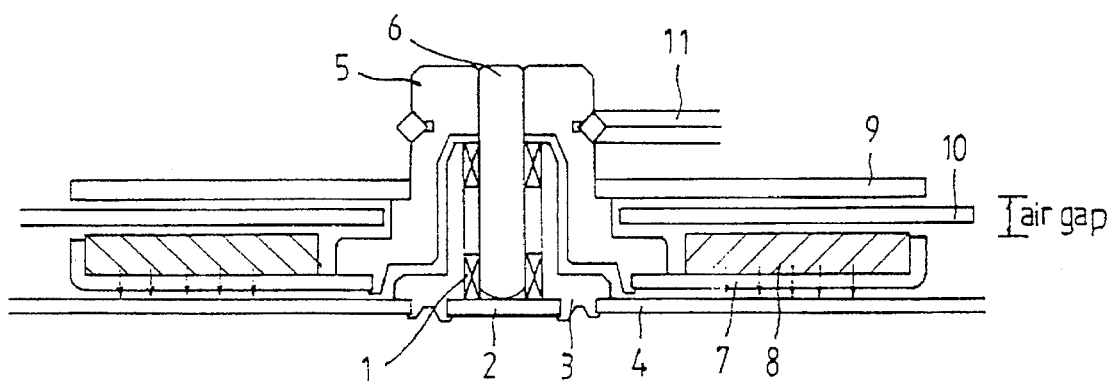
FIG. 1 is a cross-sectional view illustrating a conventional electric motor.
Figure 2:
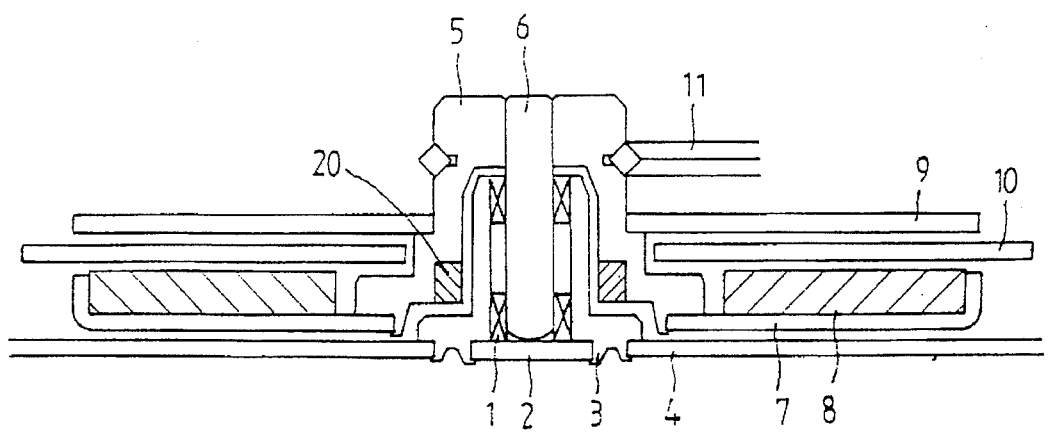
FIG. 2 is a cross-sectional view showing one embodiment of an electric motor according to the present invention.

FIG. 2 shows one embodiment of the BLDC motor according to the present invention, illustrated in a cross-sectional view. The motor has a plurality of bearings 1 which do not use oil. A washer 2 is fitted to mechanically couple with an end of a bearing bush 3. The bearing bush 3 is secured to a main base 4 by a caulking process. A motor bush 5 as part of the motor unit is forcibly inserted on a shaft 6 of the motor. A rotor yoke 7 is inserted onto the shaft 6 and caulked thereto. A first magnet 8 made of ferrite is mounted on the rotor yoke 7. A back yoke 9 is inserted on the motor bush 5 and is fixedly held in place by the magnetic force of the first magnet 8. A fine pattern coil 10 is fixed at the main base 4. The structure thus far described is equivalent to the conventional art.

A second magnet 20 is located at an inner portion of the motor bush 5 in order to provide an attractive engaging force between the bearing bush 3 and the second magnet 20.

By having an isolated second magnet 20 on the motor bush 5, dislodgement of the motor unit from the main base 4 can be prevented through the attractive engaging force between the bearing bush 3 and the second magnet 20, even when the motor is flipped over or overturned. Since this second magnet 20 is exclusively used to hold the motor unit in place, the size of the first magnet 8 can now be more feasibly adapted according to the desirable motor requirements.

Additionally, the noise due to the magnetic leakage flux conventionally used for provided the attractive engaging force, can be reduced by decreasing the size of the first magnet 8 or by increasing the thickness of the rotor yoke. Also, the effect of increased motor torque is achieved since the flux in the air gap is increased by an amount equal to the reduction of the leakage flux.

A second embodiment according to the present invention will be described with the reference to FIG. 3.

Figure 3:
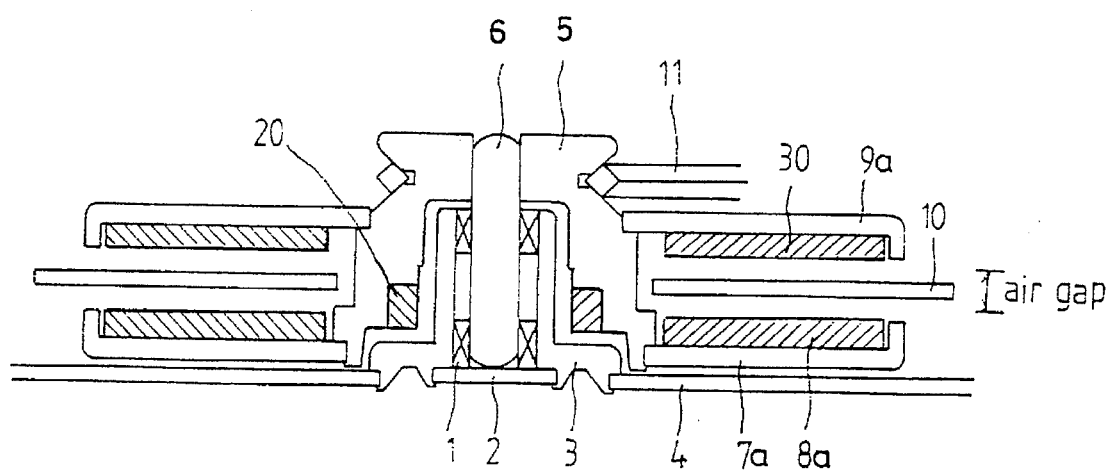
FIG. 3 is a cross-sectional view showing another embodiment of an electric motor according to the present invention.

As shown in FIG. 3, a third magnet 30 is placed opposite to a fourth magnet 8a at a lower portion of a rotor yoke 9a which is inserted onto an upper portion of the motor bush 5. The third and first magnets 30 and 8a are thinner than the first magnet 8 used in the first embodiment. That is, since an air gap amount of the second embodiment is larger than the air gap amount of the first embodiment, the thickness of the third and first magnets 30 and 8a can be reduced to be smaller than that of the first magnet 8 used in the first embodiment.

The leakage flux can be reduced by decreasing the outer diameter of the first magnet 8a and increasing the thicknesses of the rotor yokes 7a and 9a. Also, the torque of the motor is improved since two magnets 8a and 30 are used to increase the air gap flux.

While this invention has thus far been described in conjunction with only two embodiments thereof, it will readily be apparent to those skilled in the art to put this invention into practice in various other manners.

What is claimed is:

1. A brushless direct current motor comprising:

a bearing bush engaged with a main base;

a motor shaft;

a rotatable motor bush attached to said motor shaft;

a back yoke carried by the motor bush and formed as a ring-shaped plate;

a rotor yoke carried by the motor bush;

a first magnet mounted on an upper surface of the rotor yoke;

a fine pattern coil opposed to said first magnet; and a second magnet disposed on the motor bush for rotation therewith so as to provide an attractive engaging force between the bearing bush and the second magnet.

2. A brushless direct current motor comprising:

a bearing bush engaged with a main base;

a motor shaft;

a rotatable motor bush attached to said motor shaft;

a back yoke carried by the motor bush and formed as a ring-shaped plate;

a rotor yoke carried by the motor bush;

a first magnet mounted on an upper surface of the rotor yoke;

a fine pattern coil opposed to said first magnet;

a second magnet disposed on the motor bush so as to provide an attractive engaging force between the bearing bush and the second magnet; and a third magnet disposed at a lower surface of the back yoke.

3. The brushless direct current motor of claim 2, wherein said first and third magnets are approximately the same size.

* * * * *